March 24, 1970 G. M. KUNKEL 3,502,784

GASKET

Filed Sept. 11, 1968 2 Sheets-Sheet 1

INVENTOR.
GEORGE M. KUNKEL
BY
Christie, Parker & Hale
ATTORNEYS.

GASKET
Filed Sept. 11, 1968
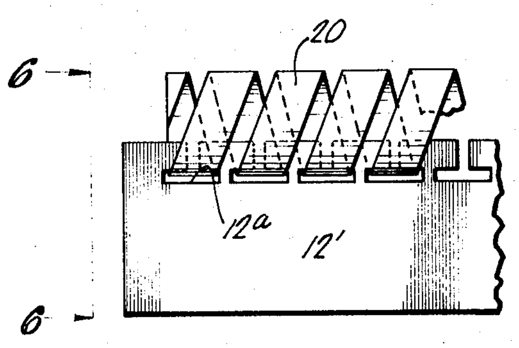
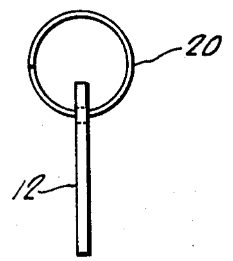
FIG. 5 FIG. 6
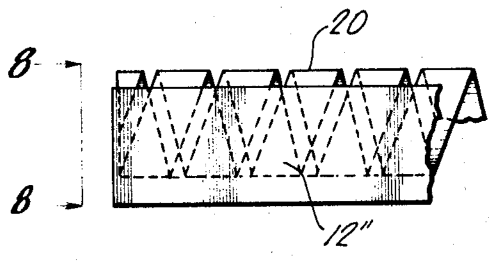
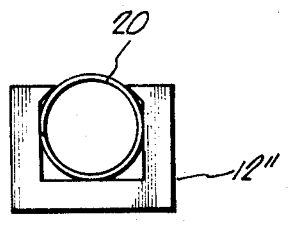
FIG. 7 FIG. 8
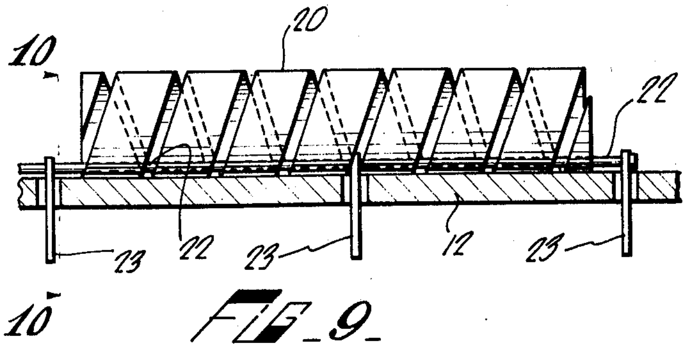
FIG. 9
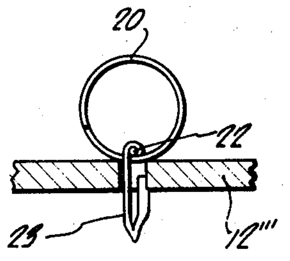
FIG. 10
INVENTOR.
GEORGE M. KUNKEL
BY
Christie, Parker & Hale
ATTORNEYS.

United States Patent Office 3,502,784

Patented Mar. 24, 1970

3,502,784

GASKET

George M. Kunkel, Sunland, Calif., assignor to Scanbe Manufacturing Corporation, Monterey, Calif., a corporation of California Filed Sept. 11, 1968, Ser. No. 759,167

Int. Cl. H05k *9/00;* F16j *15/08*

U.S. Cl. 174—35 5 Claims

ABSTRACT OF THE DISCLOSURE

A pair of spaced apart conductive surfaces to be sealed having a gasket functioning as an electromagnetic interference seal extending between the conductive surfaces and providing a pressure contact along the surfaces for sealing same against electromagnetic radiation, the gasket being constructed of a thin, flat resilient conductive element formed into a spiral with the adjacent spirals thereof arranged edge to edge for defining conductive paths through the gasket.

This invention relates to an electrically conductive gasket for use as an electromagnetic interference seal.

The failure of an electronic unit to operate properly in its intended electromagnetic environment suggests the existence of undesirable electromagnetic energy (electrical noise) or "electromagnetic interference" (EMI). This undesirable electromagnetic energy can enter the unit by being conducted in on the signal or power lines or radiated to the circuitry through the air. The radiated interference may be prevented from entering the unit by using an EMI shield, whereas conducted energy may be eliminated by the use of low pass, high pass and band pass filters as well as voltage and current regulators. The adequate elimination of electromagnetic interference from the unit results in electromagnetic compatibility (EMC).

Electronic noise (EMI) is the presence of undesirable electromagnetic energy in an electronic system where the energy is detrimental to the required performance of the system. EMI can result from the generation of intentional or unintentional electromagnetic energy. Unintentional electromagnetic energy is shot noise and thermal noise, along with lighting, static discharge, etc. Intentional electromagnetic energy encompasses most of the forms of man-made electrical energy and is of the greatest concern in the design of most electronic equipment.

In the design of an electronic system, the elimination of EMI (achievement of EMC) is of paramount importance. Such compatibility is made possible through the proper use of the cable harnesses, shielding and filtering and by the placement of components and subsystems within the system. The effectiveness of the shielding and filtering is highly dependent upon the methods by which the shielding materials are bonded together (i.e., the amount of overlap of shielding materials at the enclosure joining surfaces, the amount of pressure applied at the joining surfaces, the elimination of discontinuities in the shielding material, etc.). All joining surfaces possess electrical discontinuities between the fasteners holding the joining surfaces together due to normal irregularities in the joining materials. These discontinuities can be reduced to insignificant size by use of conductive material which has the capability of adjusting to the irregularities of the two surfaces.

RFI (radio frequency interference) was the first term used by the engineering community to describe the existence of an interference source causing the failure of electronic equipment to function as specified within its required electromagnetic environment. The interference was first noticed on radio antenna at the tuned frequency of the radio. Since radiated energy caused the interference, the RFI frequency span was generally limited to frequencies capable of being radiated from wires or antennas at relatively high power densities and specifically limmited to frequencies used for radio transmission.

EMI (electromagnetic interference) later became a recognized term to be used in lieu of RFI when the electrical noise or interference is not totally contained within the RFI definition (i.e., the interfering energy is conducted as well as radiated and at frequencies above and below the radio frequency spectrum). The electromagnetic frequency span of interest is from direct current (static field) to the highest radio or communication frequencies used.

EMC (electromagnetic compatibility) is a term used by the engineering community to describe the achievement of eliminating EMI in the design of an electronic system, whether the interference is inter-system or intra-system.

Presently there are devices for obtaining a continuous low impedance electrical path between adjoining surfaces for sealing of and bonding for electromagnetic energy. These devices include conductive finger stock and electrically conductive gasket material. The finger stock is usually constructed of beryllium copper or phosphor bronze and provides excellent bonding and shielding properties to radio frequency energy. The finger stock however is difficult to install and requires wide overlapping surfaces to be sealed for proper operation. The use of finger stock results in the fracturing of the fingers thereof quite readily and thereby the degradation of the shielding or sealing properties when used in such a fashion. This tendency towards fracture also results in additional maintenance costs.

The electromagnetic interference/radio frequency interference (EMI/RFI) gasket material that is presently known is basically constructed of thin conductive wire or small conductive particles held together by weaving or by means of a non-conductive plastic material respectively. This gasket material provides a high degree of shielding and bonding of electrical energy in the audio, radio and microwave frequencies. In the use of such conductive gasket material, however, the right shielding properties result only when such a gasket is subjected to relatively high pressures where the pressure is needed to maintain the required conductivity between the separate strands of the wire or between the conductive particles in accordance with the construction of the gasket. The necessity for weaving the conductive wires or suspending the conductive particles in a plastic-like substance renders the manufacturing cost of such a gasket relatively high. Accordingly, there is a present need for a gasket material that provides a high degree of sealing for electromagnetic and radio frequency interferences that is simple to install and provides good conductivity (and/or permeability) when subjected to relatively low pressure densities that can be manufactured at low cost.

The present invention provides an improved conductive gasket material that may be manufactured at relatively low cost and may be readily installed between two conductive surfaces with a minimum of effort. In addition, the improved gasket material of the present invention requires a relatively minimal pressure to obtain excellent conductivity and thereby sealing characteristics between two conductive surfaces to be sealed. The basic electromagnetic or sealing properties of the present invention can be improved by adding additional shielding materials in combination with the basic structure for improving the sealing properties at particular frequency ranges, such as in the audio frequency range or the microwave frequency range.

These and other features of the present invention may be more fully appreciated when considered in the light of the following specification and drawings, in which:

FIG. 5 is a partial elevational view of the gasket of FIG. 4 arranged with a means for securing the gasket in a stationary position;

FIG. 6 is an end view taken along lines 6—6 of FIG. 5;

FIG. 7 is another embodiment or arrangement for securing the gasket of FIG. 4;

FIG. 8 is a view taken along lines 8—8 of FIG. 7;

FIG. 9 is a sectional view showing a further embodiment of the means for securing the gasket of FIG. 4; and FIG. 10 is a view taken along the lines 10—10 of FIG. 9.

Figure 1:
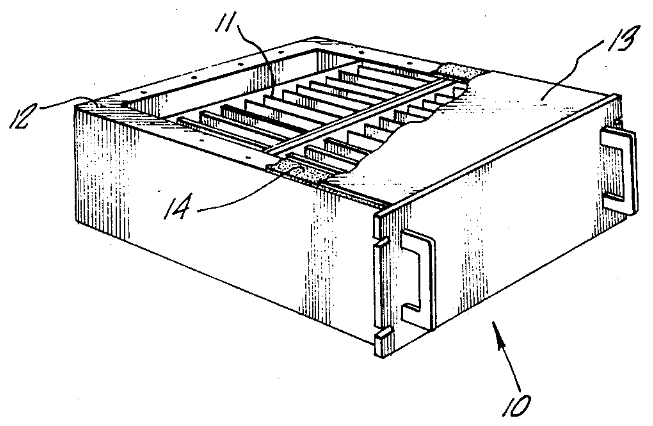
FIG. 1 is a diagrammatic view of a typical electronic equipment drawer showing the pair of surfaces sealed with a conductive gasket of the type of the present invention.

Now referring to FIG. 1, the invention will be described as it may be used in a conventional equipment drawer 10. The equipment drawer 10 is generally constructed of conductive plates to define a rectangular configuration, as illustrated. The electronic elements are generally stored in such an equipment drawer which may include printed circuit cards similar to the cards 11 illustrated stored in the drawer 10. The equipment drawer 10 is defined with a flat conductive surface 12 arranged around the entire top periphery of the drawer. Also associated with the drawer 10 is a cover plate 13 which mounts to be conductive surface 12 and is generally secured thereto by means of conventional fasteners. The top cover plate 13 is generally also of a conductive material thereby defining a conductive path at the places when the conductive surface 12 and the cover plate 13 make a relatively high pressure surface contact which is usually at the fastening places when no interference seal is employed. Radiated electromagnetic energy may then flow through the non-conducting area between the two surfaces. To reduce the radiation of the electromagnetic energy into and out of the equipment drawer 10, at a relatively low cost, a conductive gasket material generally identified by the reference numeral 14 is mounted between the conductive surface 12 and the top cover plate 13. This conductive gasket 14 is generally arranged to provide a multiplicity of electrical conductive paths between the plate 13 and the conductive surface 12 thereby shielding or sealing the electromagnetic energy from either entering the equipment drawer to interfere with the operating of the electrical equipment stored therein or to seal any electromagnetic energy generated by means of the electronic equipment stored within the drawer from being radiated from the drawer to interfere with the operation of associated drawers or electronic systems.

Figure 2:
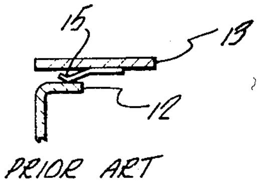
FIG. 2 is a diagrammatic sectional view of a typical sealing method employing the prior art finger stock for sealing purposes.

Referring to FIG. 2 in particular wherein there is illustrated the prior art technique of sealing from electromagnetic interference by means of conductive finger stock, it will be seen that the cover plate 13 is diagrammatically illustrated as being conductively connected to the conductive surface 12 by means of the conventional finger stock 15. This resilient element 15 provides an electrical contact between the plate 13 and the surface 12 as a result of pressure being applied between the elements 12 and 13. Since the finger stock is very thin it has a tendency to fracture upon assembly and thereby partially destroy the effectiveness of the seal.

Figure 3:
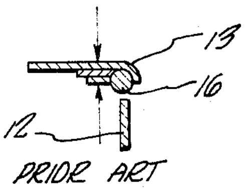
FIG. 3 is a diagrammatic sectional view of the prior art conductive gasket shown in the sealing relationship.

FIG. 3 shows a further prior art technique for shielding from electromagnetic interference through the use of a conductive gasket 16. The conductive gasket 16 is mounted between the cover plate 13 and the conductive surface 12 and provides the necessary electrical conductive sealing paths through the multiplicity of conductive paths provided in the braided electrical conductor comprising the conductive gasket 16. The conductive gasket 16 however requires a relatively high amount of pressure to produce the desired electrical contact between the elements 12, 13 and 16.

Figure 4A:
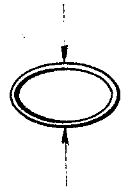
FIG. 4A is a diagrammatical illustration of the resulting configuration for the gasket of FIG. 4 when placed under pressure.
Figure 4:
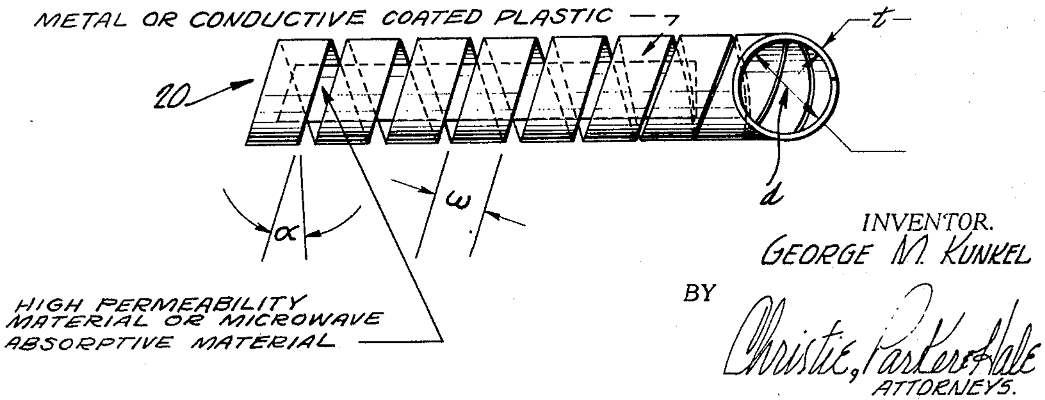
FIG. 4 is a detached perspective view of the conductive gasket embodying the present invention.

Now referring to FIG. 4 the conductive gasket of the present invention will be examined in more detail. It will be understood that the conductive gasket of the present invention will be employed in the equipment drawer 10 in the same general fashion as the conductive gasket 14 is illustrated in FIG. 1. Specifically the conductive gasket of the present invention comprises an electromagnetic interference seal constructed as a resilient electrical conductive O ring of preselected dimension for sealing the electromagnetic energy tending to propagate between the two conductive surfaces. The gasket further includes means for securing such an O ring arrangement to at least one of the conductive surfaces as is disclosed hereinbelow. The conductive gasket of the present invention as illustrated in FIG. 4 is generally identified by the reference numeral 20. The gasket as illustrated in FIG. 4 is constructed in the form of a spiral conductive gasket, the elemental O rings are interconnected. The conductive gasket 20 is constructed of a thin, flat, resilient conductive material such as copper, for example, that has been formed into a spiral of a preselected length. Each section of the spiral may be considered as an elemental seal or O ring and when constructed in a spiral fashion provides a continuous conductive element that is easy to handle and assembly into an equipment drawer, or the like. The width W of the conductive material defines the width of an elemental sealing element and the spacing between adjacent such sealing elements is defined by the pitch selected for the spiral. The pitch is identified in FIG. 4 by the angle alpha ($\alpha$). Since it is desired to employ the gasket 20 under pressure to effect the desired electrical contact between the surface to be sealed the basket 20 must have a certain resiliency and the resiliency is governed by the thickness T of the conductive material and diameter *d* of the formed gasket. In addition, the sealing properties are controlled by the inside diameter of the resulting spiral or O ring elements, since this defines the length of the conductive path. The flat, conductive material from which the spiral gasket 20 is constructed may be readily formed into a spiral through conventional manufacturing techniques such as by means of a worm gear or standard helical spring winding machine. The pitch selected for the gear, for example, will control the pitch of the spiral or the amount of the opening between the adjacent O ring sealing elements.

The overall length of the spiral will define the number of conductive paths extending between the two surfaces to be sealed and it has been found that improved conductivity is achieved by providing a large number of sealing elements or conductive paths per length of spiral for presentation to the electromagnetic interference fields along the entire joint to be sealed. The thickness of the conductive material and the inner diameter are also governed by the desirability to employ the minimal amount of pressure for effecting the desired seal and thereby the conductive element selected must be of a thickness to allow it to yield under pressure to the varying configurations of the two surfaces being joined. When such a spiral seal 20 is pressurized laterally it will assume the oblong shape similar to that illustrated in FIG. 4A.

It should also be recognized that the spiral gasket 20 may be constructed from a non-conductive material such as plastic material having a conductive coating formed on the outer surface thereof.

When the conductive material is employed to construct the gasket 20 enhanced shielding or sealing properties may be realized for a particular range of frequencies by inserting a highly permeable material in the center of the gasket 20 that is responsive to a particular frequency range to be isolated. This material may be responsive to signals in the audio frequency range to improve the sealing properties of the spiral gasket 20. In the same fashion, a microwave frequency sealing characteristic may be improved by the insertion of a microwave absorbant material inside the gasket for improving the microwave sealing properties.

It should now be evident that the conductivity and permeability afforded by the gasket 20 between two surfaces to be sealed is made possible through the provision of a greater number of low impedance conductive paths for the electromagnetic field than is afforded by the prior art seals. The number of such paths provided by the gasket 20 and the conductivity of each such path is the function of the design of the gasket 20 wherein the important variables are the contact resistance between the gasket 20 and the two joined surfaces along with the conductivity of the gasket material proper. The contact resistance between the gasket 20 and each surface is dependent upon the surface material of the gasket and the surfaces to be sealed along with the pressure applied to the surface to be sealed. The contact resistance and the conductivity can be further regulated through the regulations of the finishes applied to the basic gasket material. The pressure that is applied to the gasket 20 by means of the surfaces to be sealed is dependent upon the mechanical strength of the gasket material, the width, W, thickness, T, diameter, *d*, and pitch, alpha ($\alpha$), as identified in FIG. 4.

The ability of the gasket 20 to restrict the passage of the radiated electromagnetic energy at audio, radio and microwave frequencies is dependent upon the ability of the gasket to absorb and reflect the electromagnetic energy striking the gasket. The absorbability and reflectivity of the gasket is in turn a function of the total coverage which the gasket offers the surfaces to be sealed, the size of any discontinuities and the conductivity and permeability of the gasket material and subsequent conductive finishes of the gasket and joining surfaces.

It should now be evident that the gasket 20 may be readily assembled into an equipment drawer such as drawer 10 illustrated in FIG. 1 by some means of securing the gasket in a stationary position when the other surface to be sealed is removed. For example, to prevent the gasket 20 from shifting in its position when the cover plate 13 is removed from the drawer 10, it is desirable to provide some means for securing the gasket 20 to the conductive surface 12. One such arrangement is illustrated in FIGS. 5 and 6. The conductive surface 12' is constructed in the form of a keeper wherein inverted T slots 12$^a$ are continuously defined in the upper surface for securing the element O rings or spirals of the gasket 20 by placing them within the T elements as illustrated in FIGS. 5 and 6. When such a securing arrangement is provided, with the removal of one surface to be sealed the gasket 20 will be maintained in its stationary position to provide the desired sealing action when the cover plate 13 is once again placed into position.

A further embodiment of a securing means or keeper is illustrated in FIGS. 7 and 8. In FIGS. 7 and 8 the conductive surface 12 is provided with a longitudinal opening to accept the gasket 20 and allow a portion of the periphery of the gasket to extend above the surface when the cover plate 13 is omitted. This modified construction for a conductive surface 12 is identified as the surface 12''.

FIGS. 9 and 10 show a further arrangement for securing the gasket 20 in position. In this embodiment a locking device or wire is arranged within the gasket 20 and extends longitudinally thereof. The wire is identified by the reference numeral 22 and is secured to the conductive surface 12''' by means of a keeper 23 secured to the surface 12''' at preselected intervals.

It should now be evident that the present invention has advanced the state of the art by providing an improved electrically conductive gasket which may be inexpensively constructed in a spiral form and may be readily assembled between two surfaces thereby sealing the associated joints from electromagnetic interference.

What is claimed is:

1. In combination, a pair of spaced apart conductive surfaces to be sealed, a gasket functioning as an electromagnetic interference seal extending between the conductive surfaces and providing a pressure contact along the surfaces for sealing same against electromagnetic radiation, the gasket comprising a thin, flat, resilient, conductive element formed into a spiral of a preselected pitch with the adjacent spirals thereof arranged edge to edge for defining conductive paths through the gasket, each of said spiral paths having a preselected conductivity defined by the width of the conductive element and the diameter of the resulting spiral whereby the overall conductivity of the spiral gasket is dependent upon the pitch of the spiral for a predetermined length of conductive material, the spiral being constructed and defined to restrict the amount of energy entering into the center of the spiral and of a thickness to allow it to be responsive to pressure applied thereto to conform to the irregularities of the pair of adjacent conductive surfaces.

2. The combination as defined in claim 1 including means for securing the spiral gasket in a relatively stationary position between said surfaces to be sealed.

3. The combination as defined in claim 2 including a material of high permeability arranged inside the gasket providing audio frequency sealing.

4. The combination as defined in claim 2 including a microwave absorptive material arranged inside the gasket providing microwave frequency sealing.

5. The combination as defined in claim 1 including means for securing the spiral gasket to one of the surfaces to be sealed in a relatively stationary position.

References Cited

UNITED STATES PATENTS

| | | | |
|---|---|---|---|
| 1,733,880 | 10/1929 | Hurxthal | 777—235 XR |
| 2,469,474 | 5/1949 | Perry. | |
| 2,847,499 | 8/1958 | Peterson | 174—29 XR |
| 3,230,294 | 1/1966 | McAdams. | |

FOREIGN PATENTS

| | | |
|---|---|---|
| 941,548 | 4/1956 | Germany. |
| 1,010,680 | 11/1965 | Great Britain. |

DARRELL L. CLAY, Primary Examiner

U.S. Cl. X.R.

277—235, 236